United States Patent
Seo

(10) Patent No.: US 12,305,298 B2
(45) Date of Patent: May 20, 2025

(54) LIQUID METAL CATHODES FOR ELECTROLYSIS OF METAL CARBONATES IN MOLTEN SALTS

(71) Applicant: Dong-Kyun Seo, Chandler, AZ (US)

(72) Inventor: Dong-Kyun Seo, Chandler, AZ (US)

(73) Assignee: Arizona Board of Regents on behalf of Arizona State University, Scottsdale, AZ (US)

( * ) Notice: Subject to any disclaimer, the term of this patent is extended or adjusted under 35 U.S.C. 154(b) by 405 days.

(21) Appl. No.: 17/834,470

(22) Filed: Jun. 7, 2022

(65) Prior Publication Data

US 2022/0389599 A1    Dec. 8, 2022

Related U.S. Application Data

(60) Provisional application No. 63/197,895, filed on Jun. 7, 2021.

(51) Int. Cl.
| | |
|---|---|
| C25B 1/135 | (2021.01) |
| C25B 1/18 | (2006.01) |
| C25B 9/17 | (2021.01) |
| C25B 11/033 | (2021.01) |
| C25B 15/08 | (2006.01) |

(52) U.S. Cl.
CPC .............. *C25B 1/135* (2021.01); *C25B 1/18* (2013.01); *C25B 9/17* (2021.01); *C25B 11/033* (2021.01); *C25B 15/083* (2021.01)

(58) Field of Classification Search
CPC .............. C25B 1/135; C25B 11/033
See application file for complete search history.

(56) References Cited

U.S. PATENT DOCUMENTS

2024/0044018 A1\*    2/2024    Zavabeti ................ C25B 1/135

OTHER PUBLICATIONS

Chen et al., "A molten calcium carbonate mediator for the electrochemical conversion and absorption of carbon dioxide," Green Chem., 2020, 22:7946-7954.
Jin et al., "Effect of Temperature and Voltage on the Preparation of Solid Carbon by Electrolysis of a Molten CaCO3—Li2CO3—LiCl Electrolyte," Int. J. Electrochem. Sci., 2018, 13:9771-9783.
Licht et al., "STEP cement: Solar Thermal Electrochemical Production of CaO without CO2 emission," Chem. Commun., 2012, 48:6019-6021.
Ren et al., "Recent Advances in Solar Thermal Electrochemical Process (STEP) for Carbon Neutral Products and High Value Nanocarbons," Acc. Chem. Res., 2019, 52:3177-3187.

\* cited by examiner

*Primary Examiner* — Ciel P Contreras
(74) *Attorney, Agent, or Firm* — Fish & Richardson P.C.

(57) ABSTRACT

An electrolytic cell includes a liquid metal cathode, an anode, and a molten salt electrolyte in contact with the liquid metal cathode and the anode. The molten salt electrolyte includes carbonate ions, and the electrolytic cell is configured to reduce the carbonate ions at the surface of the cathode or in the vicinity of the cathode to yield a carbon material and oxide ions. Producing a carbon material in the electrolytic cell includes providing carbonate ions to the electrolytic cell, reducing the carbonate ions at the liquid metal cathode to yield the carbon material, and removing the carbon material from the electrolytic cell.

21 Claims, 2 Drawing Sheets

LIQUID METAL CATHODES FOR ELECTROLYSIS OF METAL CARBONATES IN MOLTEN SALTS

CROSS-REFERENCE TO RELATED APPLICATION

This application claims the benefit of U.S. Patent Application 63/197,895 filed on Jun. 7, 2021, which is incorporated herein by reference in its entirety.

TECHNICAL FIELD

This invention relates to electrolytic reduction of metal carbonates in molten salts.

BACKGROUND

Carbon materials, such as carbon nanotubes, nanofibers, aggregates, amorphous carbon, graphene, and graphite, can be formed by a variety of methods, including arc discharge, laser ablation, and chemical vapor deposition. Metal oxides can also be form by a variety of methods.

SUMMARY

A liquid metal cathode is used as the cathode in a molten salt electrolytic cell for production of carbon materials, metal oxides, or both. The carbon materials are formed at the surface of the liquid metal cathode, in the vicinity of the liquid metal cathode, or both. In some cases, the liquid metal cathode is placed on the molten salt electrolyte. Separation of the carbon materials and metal oxides produced in the electrolytic cell can be achieved by mechanical separation.

In a first general aspect, producing a carbon material in an electrolytic cell includes providing carbonate ions to an electrolytic cell. The electrolytic cell includes a liquid metal cathode, an anode, and a molten salt electrolyte in contact with the liquid metal cathode and the anode. The first general aspect further includes reducing the carbonate ions at the liquid metal cathode to yield the carbon material and removing the carbon material from the electrolytic cell.

Implementation of the first general aspect can include one or more of the following features.

In some cases, removing the carbon material from the electrolytic cell includes mechanically removing the carbon material from the liquid metal cathode, the molten salt electrolyte, or both. Mechanically removing can include settling or floating by gravity or filtering. In some implementations, reducing the carbonate ions yields a metal oxide. In some cases the metal oxide includes calcium oxide. In some implementations, a density of the metal oxide exceeds that of the molten salt electrolyte, the metal of the liquid metal cathode has a density lower than that of the molten salt electrolyte, or both. Some implementations further include removing the metal oxide from the electrolytic cell. In some implementations, mechanically removing includes settling by gravity or filtering. Certain implementations include reducing metal cations in the molten salt electrolyte to yield some of the metal in the liquid metal cathode.

In some cases, the liquid metal cathode includes a metal from Group 2 and optionally aluminum. In certain implementations, the liquid metal cathode includes a transition metal that promotes formation of carbon nanotubes or nanofibers at a surface of the liquid metal cathode. In some cases, the liquid metal cathode includes magnesium, calcium, or aluminum. Certain implementations include oxidizing the oxide ions in the electrolyte at the anode to yield oxygen gas. A metal of the liquid metal cathode typically has a solubility in the molten salt electrolyte of $\leq 3$ mol %, $\leq 1$ mol %, or $\leq 0.5$ mol % at the freezing point of the metal.

A voltage across the cathode and anode can be between about 0.5 V and about 6 V. In certain implementations, the molten salt electrolyte includes a metal halide and a metal carbonate. Some implementations include heating the molten salt electrolyte at a temperature between the freezing point of the metal of the liquid metal cathode and about 950° C.

Some implementations include subjecting the liquid metal cathode, the molten salt electrolyte, or both to a mechanical process to reduce accumulation of the carbon material at the surface of the liquid metal cathode or in the vicinity of the liquid metal cathode. In certain implementations, the molten salt electrolyte includes calcium chloride, calcium carbonate, and calcium oxide, and reducing the carbonate ions yields oxide ions. The oxide ions can be reacted with calcium to yield calcium oxide. In some implementations, the molten salt electrolyte includes an alkali chloride, calcium carbonate, and calcium oxide, and reducing the carbonate ions yields oxide ions. The oxide ions can be reacted with calcium to yield calcium oxide.

In a second general aspect, an electrolytic cell includes a liquid metal cathode, an anode, and a molten salt electrolyte in contact with the liquid metal cathode and the anode. The molten salt electrolyte includes carbonate ions, and the electrolytic cell is configured to reduce the carbonate ions at the surface of the cathode or in the vicinity of the cathode to yield a carbon material and oxide ions.

In some implementations of the second general aspect, the metal of the liquid metal cathode has a density lower than that of the molten salt electrolyte.

The details of one or more embodiments of the subject matter of this disclosure are set forth in the accompanying drawings and the description. Other features, aspects, and advantages of the subject matter will become apparent from the description, the drawings, and the claims.

DETAILED DESCRIPTION

In electrolytic reduction of metal carbonates in molten salts at elevated temperatures, carbon materials are formed by reduction of carbonate ions at or near the surface of the cathode. The carbon materials can be in various forms including carbon nanotubes, nanofibers, aggregates, amorphous carbon, graphene, graphite, or any combination thereof. In some cases, the formation of carbon materials at the cathode is accompanied by formation of metal oxide particles. The metal oxide particles can be intermingled with the carbon materials. Formation of metal oxide by electrolytic reduction of carbonates can be advantageous over conventional metal oxide production methods. In one example, the electrolytic reduction of calcium carbonate to form carbon materials and calcium oxide (CaO) can be desirable in reducing greenhouse gas emissions by producing CaO without emission of $CO_2$.

This disclosure describes systems and methods for formation of solid carbon materials, metal oxides, or both by reduction of carbonate ions in an electrolytic cell with a liquid metal cathode and a molten salt electrolyte. In some cases, the liquid metal cathode is placed on a surface of the molten salt electrolyte. The reduction takes place at the surface or in a vicinity of the liquid metal cathode. Since the surface of the liquid metal does not have a rigid structure, the carbon materials formed by reduction of carbonate do not adhere permanently to the liquid metal surface. In some cases, the carbon materials can be removed from the cathode surface and be collected without a need of removing the cathode from the electrolytic cell.

Figure 1:
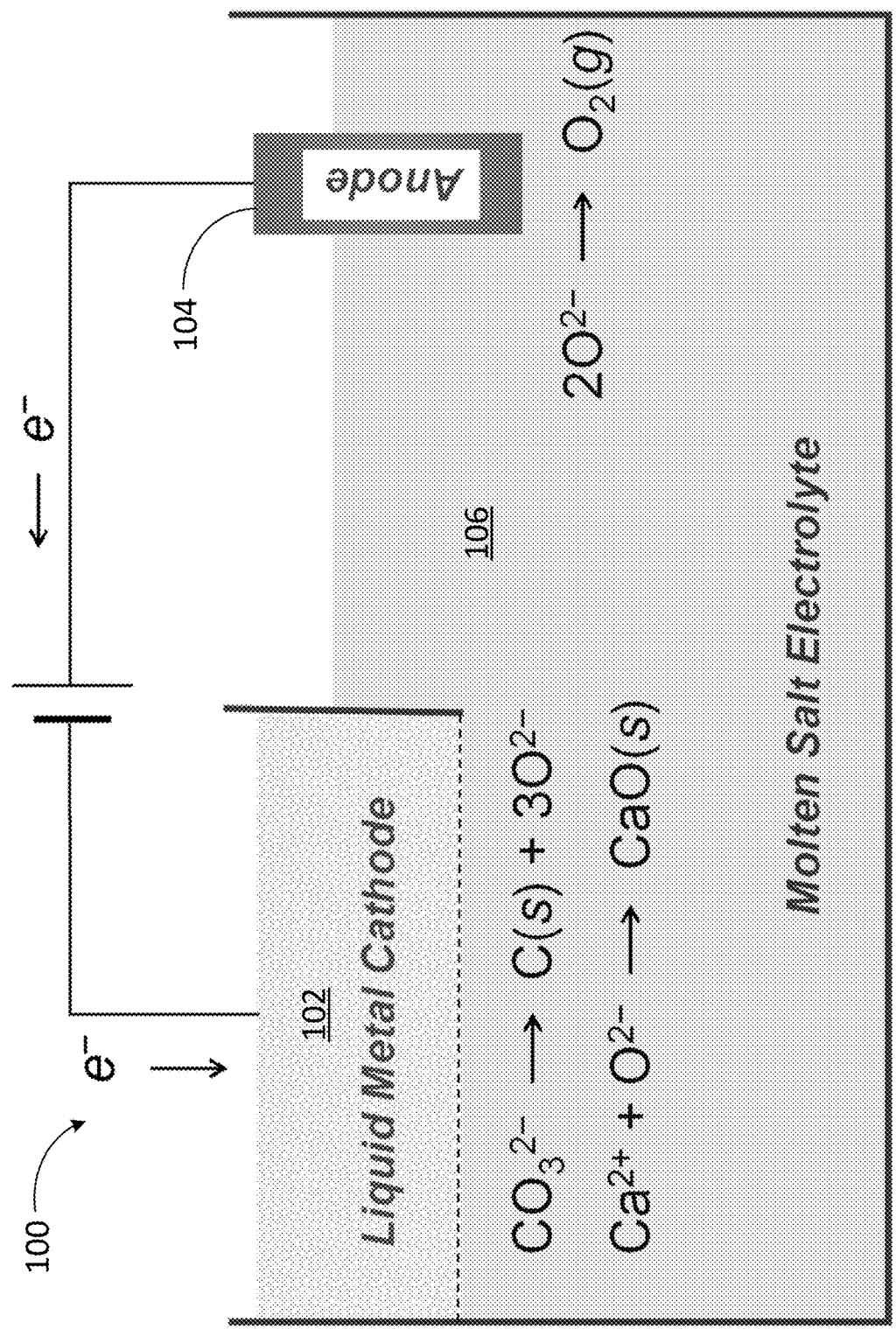
FIG. 1 is a schematic diagram of an electrolytic cell having a liquid metal cathode, a solid anode, and a molten salt electrolyte.

FIG. 1 depicts an embodiment of an electrolytic cell 100 that has a liquid metal cathode 102, a solid anode 104, and a molten salt electrolyte 106 in contact with the liquid metal cathode 102 and the anode 104. The molten salt electrolyte 106 contains dissolved metal carbonate. Carbonate ions can be introduced to the electrolyte by dissolution of metal carbonates. The liquid metal of the liquid metal cathode 102 and the molten salt electrolyte 106 form two phases in the electrolytic cell 100, with the liquid metal in direct contact with the molten salt electrolyte 106. When the carbonate ions are reduced to a solid carbon material at the liquid metal cathode 102, oxide ions are released. The oxide ions can be combined with metal cations in the molten salt electrolyte 106 to yield a metal oxide. When the molten salt electrolyte 106 is saturated with the metal oxide, formation of additional metal oxide can result in a metal oxide precipitate at the surface or in the vicinity of the liquid metal cathode 102. In some cases, at least some of the liquid metal in the liquid metal cathode 102 is produced by reduction of metal ions dissolved in the molten salt electrolyte 106. As depicted in FIG. 1, the liquid metal cathode 102 is calcium and the molten salt electrolyte 106 is $CaO$—$CaCO_3$—$CaCl_2$.

Figure 2:
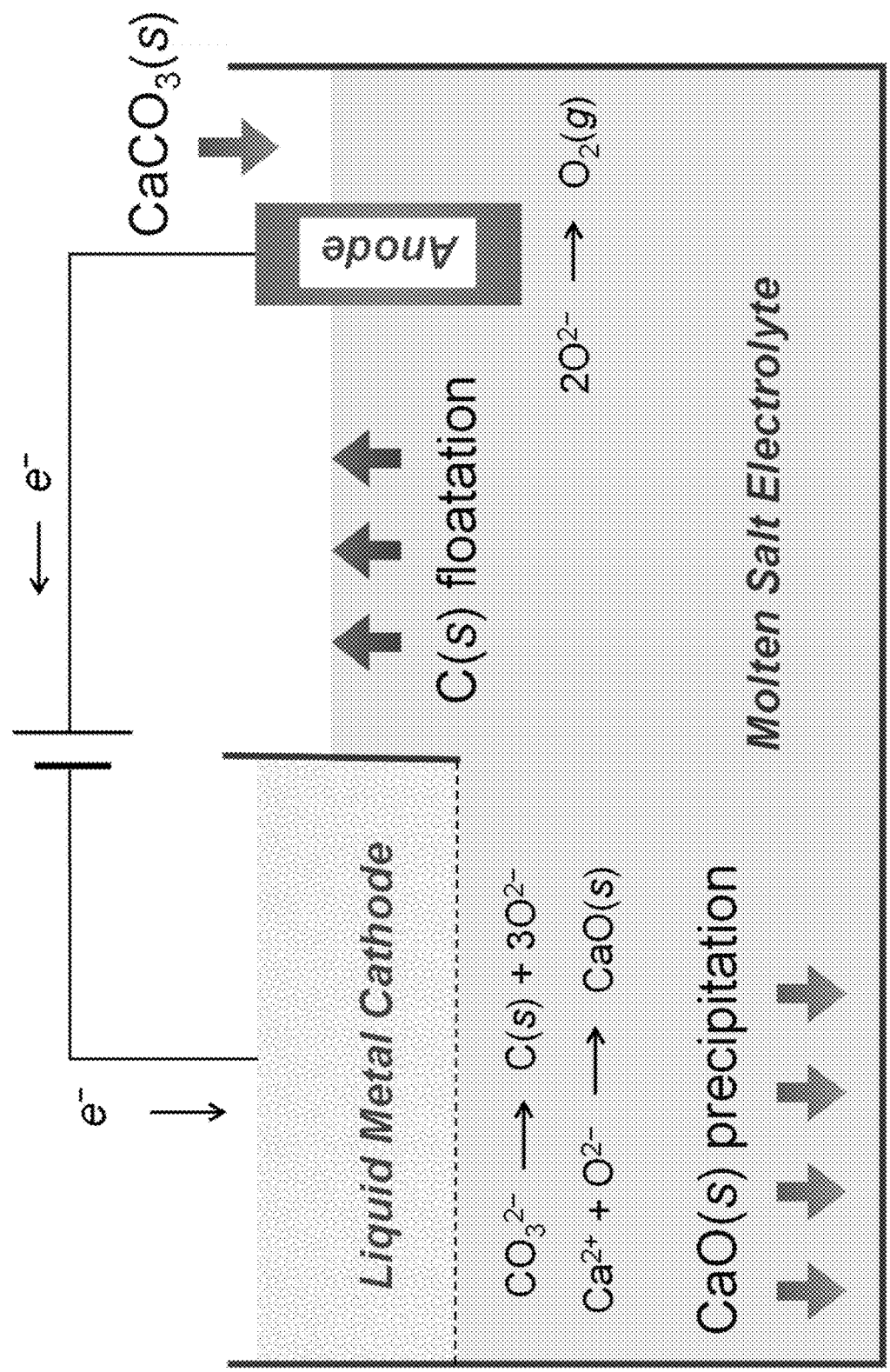
FIG. 2 is a schematic diagram of an electrolytic cell in which carbon product floats on the electrolyte and a metal oxide product precipitates from the electrolyte.

The liquid metal cathode 102, the molten salt electrolyte 106, or both can be subjected to a mechanical process (e.g., stirring, agitating, vibrating, ultrasonicating, shaking, pumping, bubbling, or circulating) so that the carbon material does not accumulate at the surface of or in a vicinity of the liquid metal cathode 102. Carbon materials produced at the liquid metal cathode 102 can have a density less than that of the molten salt electrolyte 106. A density of the metal oxide product can be greater than that of the molten salt electrolyte 106. The carbon materials, the metal oxide product, or both can be separated from the molten salt electrolyte 106 by a mechanical process (e.g., gravity, filtration). FIG. 2 depicts the electrolytic cell of FIG. 1 with a carbon product floating to a surface of the molten salt electrolyte and the metal oxide product precipitating from the molten salt electrolyte.

The liquid metal cathode can be in the form of a body of a liquid metal. In some cases, the liquid metal cathode can be in the form of a coating or a layer on a solid. In the electrolytic cell, the liquid metal can be in a first phase, and the molten salt can be in a second phase, with the first and second phases being immiscible. In some cases, the liquid metal cathode is in the form of a droplet. In some cases, the liquid metal cathode contains solid particles, fibers, or both.

The liquid metal cathode can be a single metal or an alloy of two or more metals. In some cases, the liquid metal includes magnesium. In some cases, the liquid metal includes calcium. In some cases, the liquid metal includes aluminum. Alloying typically allows a lower freezing point compared to the pure metal constituents, and thus can widen the operating temperature window. The phase diagram of the alloy can exhibit at least one eutectic point. In one example, the liquid metal is an alloy of calcium (M.P.=842° C.) and magnesium (M.P.=650° C.). The binary phase diagram of calcium and magnesium shows eutectic points around 445° C. and 519° C. Alloying can allow a lower reducing activity relative to the most active metal constituent. Examples of suitable alloys for liquid metal cathodes include Mg—Al, Mg—Sn, Ca—Mg, Ca—Al and Ca—Sn. In some cases, the liquid metal includes one or more transition metals, such as Mn, Fe, Co, Ni, Cu, and Zn. The transition metals can promote growth of carbon nanotubes, nanofibers, or both. The liquid metal can be at least partially soluble in the molten salt electrolyte. In some cases, the liquid metal has a solubility in the molten salt electrolyte of ≤3 mol %, ≤1 mol %, or ≤0.5 mol % at the freezing point of the metal of the liquid metal cathode. In some cases, the liquid metal has a solubility in the molten salt electrolyte of ≤3 mol %, ≤1 mol %, or ≤0.5 mol % at 850° C.

The metal carbonates include magnesium carbonate, calcium carbonate, strontium carbonate, barium carbonate, lithium carbonate, sodium carbonate, potassium carbonate, rubidium carbonate, cesium carbonate, and rare earth metal carbonates (rare earth metal=Sc, Y, La, Ce, Pr, Nd, Pm, Sm, Eu, Gd, Tb, Dy, Ho, Er, Tm, Yb and Lu). In some cases, the carbonate ions are introduced to the electrolyte by absorption of carbon dioxide gas by the electrolyte.

In some cases, the liquid metal and the electrolyte are chosen in such a way that the liquid metal has a density lower than that of the electrolyte at the operating temperature of the electrolysis. Examples of suitable components for the molten salt electrolyte include one or more of calcium chloride and alkali chlorides (NaCl, KCl, RbCl, and CsCl). Examples of suitable components for the molten salt electrolyte include one or more of calcium carbonate, and calcium oxide. The electrolyte can be saturated with one or more of these components (e.g., calcium oxide). Examples of suitable components for the molten salt electrolyte include one or more of calcium carbonate, alkali chlorides (NaCl, KCl, RbCl and CsCl), and calcium oxide. The electrolyte can be saturated with one or more of these components (e.g., calcium oxide).

Examples of suitable anode materials include graphite, nickel, iridium, $RuO_2$, $TiO_2$, titanium suboxides (e.g., $Ti_4O_7$) and $Ni_{10}Cu_{11}Fe$.

Although this disclosure contains many specific embodiment details, these should not be construed as limitations on the scope of the subject matter or on the scope of what may be claimed, but rather as descriptions of features that may be specific to particular embodiments. Certain features that are described in this disclosure in the context of separate embodiments can also be implemented, in combination, in a single embodiment. Conversely, various features that are described in the context of a single embodiment can also be implemented in multiple embodiments, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular embodiments of the subject matter have been described. Other embodiments, alterations, and permutations of the described embodiments are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results.

Accordingly, the previously described example embodiments do not define or constrain this disclosure. Other changes, substitutions, and alterations are also possible without departing from the spirit and scope of this disclosure.

What is claimed is:

1. A method of producing a carbon material in an electrolytic cell, the method comprising:
providing carbonate ions to an electrolytic cell comprising:
a liquid metal cathode;
an anode; and
a molten salt electrolyte in contact with the liquid metal cathode and the anode;
reducing the carbonate ions at the liquid metal cathode to yield the carbon material; and
removing the carbon material from the electrolytic cell.

2. The method of claim 1, wherein removing the carbon material from the electrolytic cell comprises mechanically removing the carbon material from the liquid metal cathode, the molten salt electrolyte, or both.

3. The method of claim 2, wherein mechanically removing comprises settling or floating by gravity or filtering.

4. The method of claim 1, wherein reducing the carbonate ions yields a metal oxide.

5. The method of claim 4, wherein the metal oxide comprises calcium oxide.

6. The method of claim 4, wherein a density of the metal oxide exceeds that of the molten salt electrolyte.

7. The method of claim 6, further comprising removing the metal oxide from the electrolytic cell.

8. The method of claim 7, wherein mechanically removing comprises settling by gravity or filtering.

9. The method of claim 1, further comprising reducing metal cations in the molten salt electrolyte to yield some of the metal in the liquid metal cathode.

10. The method of claim 1, wherein the liquid metal cathode comprises a metal from Group 2 and optionally aluminum.

11. The method of claim 10, wherein the liquid metal cathode comprises a transition metal that promotes formation of carbon nanotubes or nanofibers at a surface of the liquid metal cathode.

12. The method of claim 1, wherein the liquid metal cathode comprises magnesium, calcium, or aluminum.

13. The method of claim 1, further comprising oxidizing the oxide ions in the electrolyte at the anode to yield oxygen gas.

14. The method of claim 1, wherein a voltage across the cathode and anode is between about 0.5 V and about 6 V.

15. The method of claim 1, wherein the molten salt electrolyte comprises a metal halide and a metal carbonate.

16. The method of claim 1, further comprising heating the molten salt electrolyte at a temperature between the freezing point of the metal of the liquid metal cathode and about 950° C.

17. The method of claim 1, wherein a metal of the liquid metal cathode has a solubility in the molten salt electrolyte of ≤3 mol %, ≤1 mol %, or ≤0.5 mol % at the freezing point of the metal.

18. The method of claim 1, further comprising subjecting the liquid metal cathode, the molten salt electrolyte, or both to a mechanical process to reduce accumulation of the carbon material at the surface of the liquid metal cathode or in the vicinity of the liquid metal cathode.

19. The method of claim 1, wherein the molten salt electrolyte comprises calcium chloride, calcium carbonate, and calcium oxide and reducing the carbonate ions yields oxide ions, and further comprising reacting the oxide ions with calcium to yield calcium oxide.

20. The method of claim 1, wherein the molten salt electrolyte comprises an alkali chloride, calcium carbonate and calcium oxide and reducing the carbonate ions yields oxide ions, and further comprising reacting the oxide ions with calcium to yield calcium oxide.

21. The method of claim 1, wherein the metal of the liquid metal cathode has a density lower than that of the molten salt electrolyte.

* * * * *